US008463891B2

(12) United States Patent
Peng et al.

(10) Patent No.: US 8,463,891 B2

(45) Date of Patent: Jun. 11, 2013

(54) MULTICAST BROADCAST SERVICE MANAGEMENT METHOD, DEVICE, AND SYSTEM

(75) Inventors: Chenghui Peng, Shenzhen (CN); Wei Zhang, Shenzhen (CN); Wenliang Liang, Shenzhen (CN); Yong Xie, Shenzhen (CN); Liang Gu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 13/033,401

(22) Filed: Feb. 23, 2011

(65) Prior Publication Data

US 2011/0145387 A1 Jun. 16, 2011

Related U.S. Application Data

(63) Continuation of application No. PCT/CN2009/072050, filed on May 31, 2009.

(30) Foreign Application Priority Data

Aug. 23, 2008 (CN) .......................... 2008 1 0142073

(51) Int. Cl.
*G06F 13/00* (2006.01)

(52) U.S. Cl.
USPC .......................................... 709/223; 709/227

(58) Field of Classification Search
USPC ................................ 709/223, 224, 227, 228
See application file for complete search history.

(56) References Cited

U.S. PATENT DOCUMENTS

| | | | | |
|---|---|---|---|---|
| 7,664,503 | B2 * | 2/2010 | Choi et al. | 455/445 |
| 2006/0140159 | A1 | 6/2006 | Choi et al. | |
| 2008/0089265 | A1 | 4/2008 | Park et al. | |
| 2008/0101376 | A1 | 5/2008 | Do et al. | |
| 2008/0107092 | A1 | 5/2008 | Taaghol et al. | |
| 2010/0128704 | A1 * | 5/2010 | Taaghol et al. | 370/338 |

FOREIGN PATENT DOCUMENTS

| | | | |
|---|---|---|---|
| CN | 1499760 | A | 5/2004 |
| CN | 1753551 | A | 3/2006 |
| CN | 101043639 | A | 9/2007 |
| CN | 101150422 | A | 3/2008 |
| CN | 101420314 | A | 4/2009 |

(Continued)

OTHER PUBLICATIONS

Written Opinion of the International Searching Authority issued in corresponding PCT Patent Application No. PCT/CN2009/072050, mailed Sep. 10, 2009.

(Continued)

*Primary Examiner* — Kenneth R Coulter
(74) *Attorney, Agent, or Firm* — Brinks Hofer Gilson & Lione

(57) ABSTRACT

A multicast broadcast service (MBS) management method, device, and system are provided, so that a service/content provision server is enabled to manage an MBS operated by the service/content provision server itself. The method includes: a universal service interface (USI) receives a management operation request message from a service/content provision server; the management operation request message is sent to a multicast and broadcast service (MCBCS) server/controller to enable the MCBCS server/controller to perform corresponding operations according to the management operation request message. The device includes a first receiving module and a second receiving module. Another device includes a receiving module and a request processing module. The system includes an MCBCS server/controller and a USI connected to the MCBCS server/controller in a communication mode.

14 Claims, 3 Drawing Sheets

FOREIGN PATENT DOCUMENTS

CN 101656615 B 2/2012

OTHER PUBLICATIONS

Office Action issued in corresponding Chinese Patent Application No. 200810142073.9, mailed Feb. 23, 2011.

"Universal Services Interface (USI) an Architecture for Internet+ Service Model" WiMAX Forum Proprietary. 2007.

International Search Report issued in corresponding PCT Application No. PCT/2009/072050; mailed Sep. 10, 2009.

* cited by examiner

MULTICAST BROADCAST SERVICE MANAGEMENT METHOD, DEVICE, AND SYSTEM

CROSS-REFERENCE TO RELATED APPLICATIONS

This application is a continuation of International Application No. PCT/CN2009/072050, filed on May 31, 2009, which claims priority to Chinese Patent Application No. 200810142073.9, filed on Aug. 23, 2008, both of which are hereby incorporated by reference in their entireties.

FIELD OF THE TECHNOLOGY

The present invention relates to the field of communication technology, and more particularly to a multicast broadcast service (MBS) management method, device, and system.

BACKGROUND OF THE INVENTION

When a multicast broadcast service (MBS) is applied in a wireless network, the same information content is sent to a plurality of or all terminal users via an air interface, so as to share wireless network resources and increase the utilization of the network resources. The MBS is also defined in various communication standards, for example, a multimedia broadcast/multicast service (MBMS) defined in the 3rd Generation Partnership Project (3GPP) and broadcast/multicast services (BCMCS) defined in the 3rd Generation Partnership Project 2 (3GPP2).

The Worldwide Interoperability for Microwave Access (WiMAX) forum also formulates a multicast and broadcast service (MCBCS) as the definition of the MBS based on characteristics of the WiMAX network, and defines an MCBCS server/controller for realizing the MCBCS. In a network, the MBS content is provided by a service/content provider through a service/content provision server. The service/content provider can be a third party other than the communication network operator. The MCBCS server/controller has the following functions: maintaining service information of the MCBCS, deciding and controlling start and termination of an MCBCS session, managing service subscription, authentication, and accounting, storing and forwarding content provided by the service/content provision server, and integrating different content and channels into a program and delivering the integrated program to an access network. Meanwhile, the MCBCS server/controller may serve as a content server.

With the requirement of opening the network services, a third party application interface capable of opening services of the WiMAX network to inside or outside of the network, that is, a universal service interface (USI), is also introduced in the WiMAX network. The WiMAX network provides a service interface for an application service provider (ASP)/Internet ASP (iASP) through a USI system. By invoking the service capability provided by the USI, the ASP or iASP may utilize services open for a WiMAX access terminal and personalized services can be provided to the WiMAX access terminal more conveniently through an ASP network or the Internet. The service capability of the WiMAX network opened through the USI system includes Quality of Service (QoS), location service, terminal information query, and terminal authentication.

FIG. 1 shows a network reference model of a USI system. A mobile station (MS), an access service network (ASN), and a connectivity service network (CSN) are three major parts of a WiMAX network. The ASP/iASP is an application service provider independent from the WiMAX network. As shown in FIG. 1, the USI system is located in the CSN or possibly outside the CSN. A plurality of CSNs shares the same USI system. The USI system interacts with the ASP/iASP through a U1 interface. The USI system may also optionally interact with an authentication, authorization, and accounting (AAA) server, a message server, and a location server in the CSN. An existing Internet interface (for example, a Hypertext Transfer Protocol (HTTP) method) is employed for the interaction between the MS and the ASP/iASP.

The inventor finds that in the prior art, for the MBS defined in the WiMAX network, only a content delivery operation between the service/content provision server and the MCBCS server/controller is defined, while a management operation by the service/content provision server on the MBS provided to a terminal user by the MCBCS server/controller is not defined. Therefore, in the prior art, the service/content provision server may not realize effective management of the MBS operated by the service/content provision server itself, for example, the service/content provision server is unable to change QoS of an MBS session dynamically or make statistics on user information in real time.

SUMMARY OF THE INVENTION

The present invention is directed to an MBS management method, device, and system, so as to enable a service/content provision server to manage an MBS operated by the service/content provision server itself.

The present invention provides an MBS management method, which includes:

A USI receives a management operation request message from a service/content provision server;

The management operation request message is sent to an MCBCS server/controller to enable the MCBCS server/controller to perform corresponding operations according to the management operation request message.

The present invention provides an MBS management device, which includes a first receiving module and a first sending module, wherein:

The first receiving module is adapted to receive a management operation request message from a service/content provision server;

The first sending module is adapted to forward the management operation request message received by the first receiving module to an MCBCS server/controller to enable the MCBCS server/controller to perform corresponding operations according to the management operation request message.

The present invention provides an MBS management device, which includes a receiving module and a request processing module, wherein:

The receiving module is adapted to receive an MBS-session management operation request message from a USI. The MBS-session management operation request message is forwarded from a service/content provision server;

The request processing module is adapted to perform corresponding management operations according to the MBS-session management operation request message received by the receiving module.

The present invention provides an MBS management system, which includes an MCBCS server/controller and a USI in communication with the MCBCS server/controller, wherein:

The USI is adapted to forward an MBS-session management operation request message from a service/content provision server to the MCBCS server/controller;

The MCBCS server/controller is adapted to receive the MBS-session management operation request message from the USI and perform corresponding management operations according to the MBS-session management operation request message.

By applying the method, device, and system according to the embodiments of the present invention, the service/content provision server sends an MBS-session management operation request message to the USI, the USI forwards the MBS-session management operation request message to the MCBCS server/controller after authentication, and the MCBCS server/controller performs corresponding management operations according to the MBS-session management operation request message, so that the service/content provision server is enabled to manage the MBS operated by the service/content provision server itself.

DETAILED DESCRIPTION OF THE EMBODIMENTS

For better understanding of the objective, technical solution and merits of the present invention, the following describes the present invention in detail with reference to the accompanying drawings.

In an embodiment, the present invention provides an MBS management method.

Figure 1:
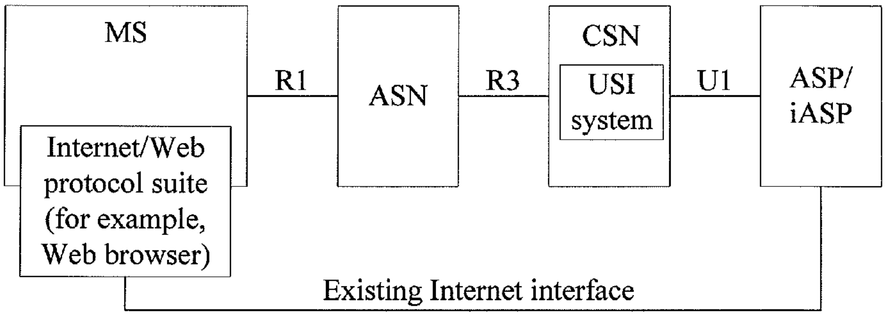
FIG. 1 is a network reference model diagram of a USI system.
Figure 2:
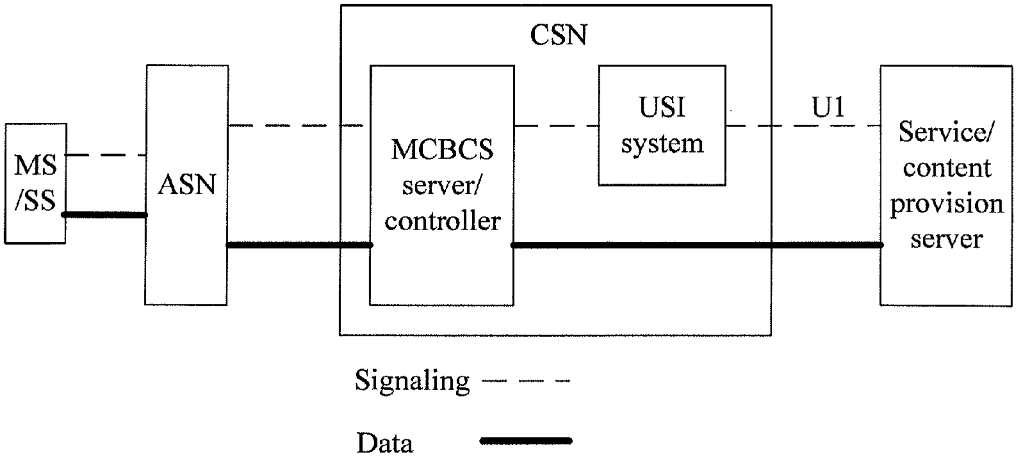
FIG. 2 is a schematic view of a work scenario of an MBS management method according to an embodiment of the present invention.

A work scenario of the MBS management method according to the embodiment of the present invention is shown in FIG. 2. An MCBCS server/controller located in a CSN provides an MBS for a mobile station (MS)/subscriber station (SS) as a user through an ASN. In the embodiment of the present invention, a USI system that is also located in the CSN is introduced, which is connected in a communication mode to the MCBCS server/controller and the service/content provision server that provides the service/content for the MCBCS server/controller respectively. The service/content provision server may be a third party server. The service/content provision server performs management operations on the MCBCS server/controller by invoking the USI system, so as to realize management of the MBS operated by the service/content provision server itself.

Operation requests and responses defined in the method can be realized through web services or a middleware technology. The implementation modes of both the web services and the middleware exist in the prior art, and the details thereof may not be given herein again.

Figure 3:
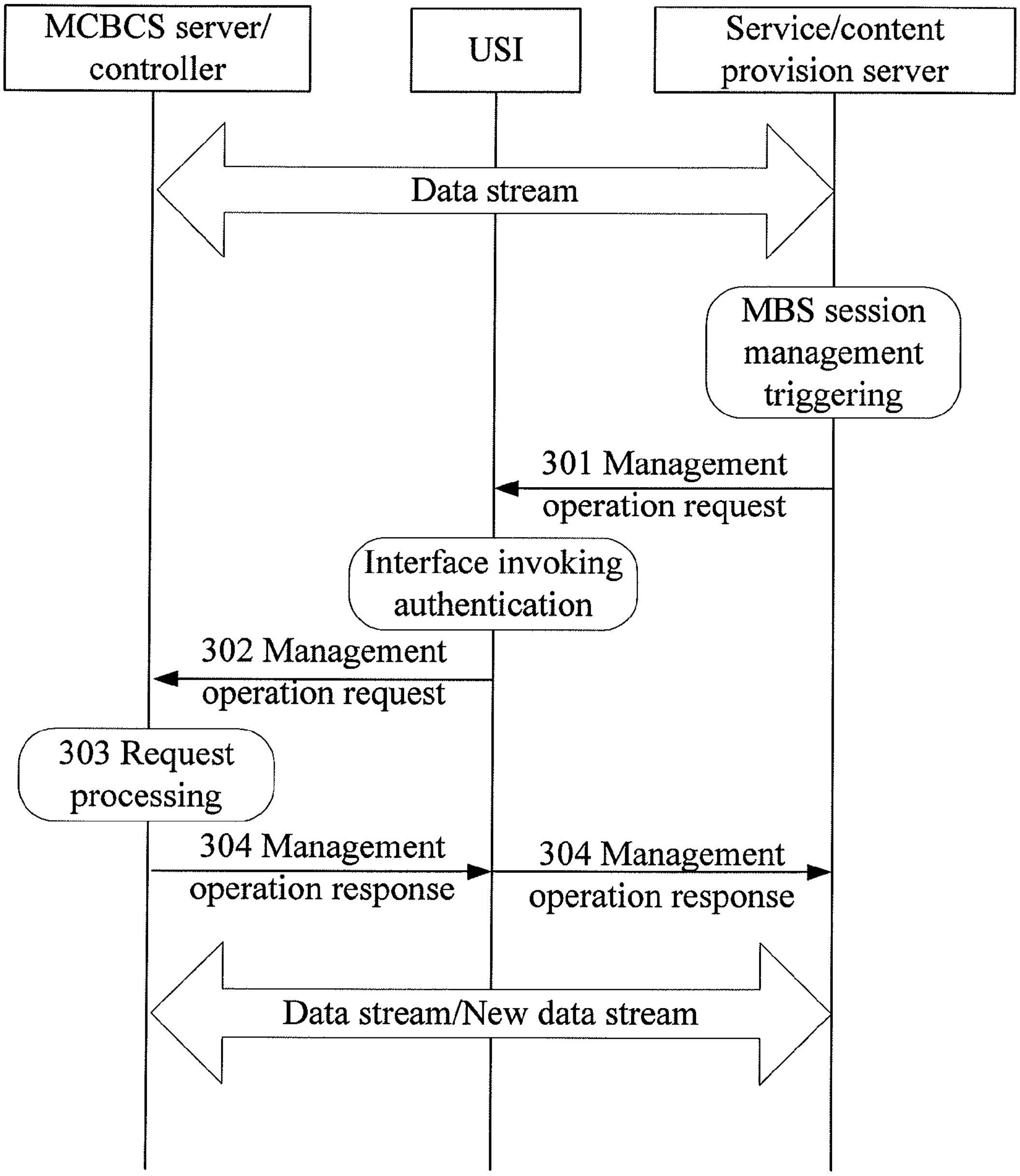
FIG. 3 is a flow chart of an MBS management method according to an embodiment of the present invention.

As shown in FIG. 3, the method includes the following steps.

In Step 301, a service/content provision server sends an MBS-session management operation request message to a USI according to a service trigger condition.

The trigger condition is defined by the service/content provision server according to a policy of its own. For example, the trigger condition may be that the QoS of a delivered media flow of an MBS session is changed or a program is interrupted. However, in this embodiment, the present invention provides a management method by a service/content provision server on an MBS operated by the service/content provision server itself, and the trigger conditions of the management operation themselves are not within the scope of the present invention.

The MBS-session management operation request message is adapted to indicate an MCBCS server/controller to perform corresponding management operations, so as to enable the service/content provision server to manage the MBS operated by the service/content provision server itself. According to different management items, in this embodiment of the present invention, the MBS-session management operation request message may be further specified, as shown in Table 1.

TABLE 1

| Operation-request-message Name | Operation Description |
|---|---|
| StartMBSSession | Start an MBS session |
| TerminateMBSSession | Terminate or suspend an MBS session |
| SubscribeMBSEvent | Subscribe to an MBS event |
| StopMBSEvent | Stop subscription of an MBS event |
| ModifyMBSSessionQoS | Modify QoS of an MBS session |
| UpdateMBSServiceGuide | Update an MBS service guide |
| UpdateMBSContent | Update MBS content |

Specific definitions of the above MBS-session management operation request messages are illustrated in the following.

StartMBSSession Message/TerminateMBSSession Message

If the service/content provision server needs to start an MBS session that is in a terminated state, a StartMBSSession message is sent. The StartMBSSession message is adapted to trigger the MCBCS server/controller to start the MBS session.

If the service/content provision server needs to terminate an ongoing MBS session, a TerminateMBSSession message is sent. The TerminateMBSSession message is adapted to trigger the MCBCS server/controller to terminate or suspend the MBS session.

The definition of the StartMBSSession message/TerminateMBSSession message is shown in Table 2.

TABLE 2

| Parameter | Type | Number | Definition |
|---|---|---|---|
| SessionID | string | 1+ | Session identifier |

It can be seen from Table 2 that, the StartMBSSession message or TerminateMBSSession message carries at least one SessionID. A type of the SessionID parameter is a string type. One SessionID is corresponding to one MBS session. A corresponding relation between the SessionID and the session is prearranged by the service/content provision server and the MCBCS server/controller.

SubscribeMBSEvent Message/StopMBSEvent Message

The SubscribeMBSEvent message is adapted to subscribe to a corresponding event of a specific MBS session, for example, an event that a user joins in or quits a specific MBS session. The service/content provision server is enabled to make statistics on information such as a user number by receiving a response message to the subscription of the event.

When the service/content provision server no longer needs to receive an event in a subscribed state, the service/content provision server may cancel subscription of the corresponding event by sending the StopMBSEvent message.

Definition of the SubscribeMBSEvent message/StopMBSEvent message is shown in Table 3.

TABLE 3

| Parameter | Type | Number | Definition |
|---|---|---|---|
| SessionID | string | 1 | Session identifier |
| EventPackage | string | 1+ | Name of a subscribed event package |
| Duration | int | 0-1 | Subscription duration |
| Interval | int | 0-1 | Periodic notification interval |

It can be seen from Table 3 that, the SubscribeMBSEvent message or the StopMBSEvent message carries SessionID and at least one EventPackage. A parameter type of the SessionID and the EventPackage is a string type.

The SessionID is adapted to indicate which existing MBS session event is requested to be subscribed to in the SubscribeMBSEvent message, or adapted to indicate which existing MBS session event is to be stopped from subscription in the StopMBSEvent message. One SessionID is corresponding to one MBS session.

The EventPackage, its corresponding event packages, and specific events included in each event package can be randomly arranged by the MCBCS server/controller and the service/content provision server through negotiation. The event package at least includes one event. For the negotiation, agreement shall be reached before the subscription operation. In the embodiments of the present invention, it is assumed that the negotiation process is already finished, so that the EventPackage, its corresponding relation with the event packages, and specific events included in each event package are not defined.

Optionally, the SubscribeMBSEvent message may also carry Duration or Interval. A parameter type of the Duration and Interval is an integer (int) type.

The Duration is adapted to indicate a valid duration of the current event subscription. The Interval is adapted to indicate a time period of notification by the MCBCS server/controller.

ModifyMBSSessionQoS Message

For the service/content provision server, when the content being played is changed, for example, from a normal definition program to a high definition program, the requirement of session QoS may also change accordingly. In this case, the service/content provision server needs to send a ModifyMBSSessionQoS message. The ModifyMBSSessionQoS message is adapted to trigger the MCBCS server/controller to initiate QoS update of a corresponding session.

Definition of the ModifyMBSSessionQoS message is shown in Table 4.

TABLE 4

| Parameter | Type | Number | Definition |
|---|---|---|---|
| SessionID | string | 1 | Session identifier |
| qoSFlowInfo | QoSFlowInfo | 1+ | QoS parameter |

It can be seen from Table 4 that, the ModifyMBSSessionQoS message carries SessionID and at least one QoS parameter (qoSFlowInfo). The SessionID is adapted to indicate an MBS session that the QoS thereof needs to be modified. A parameter type of the SessionID is a string type. One SessionID is corresponding to one MBS session. The QoS parameter is adapted to indicate a specific QoS modification parameter. Definition of the QoS parameter is shown in Table 5.

TABLE 5

| Parameter | Type | Number | Definition |
|---|---|---|---|
| flowNumber | int | 1 | Serial number of an IP flow of an MBS that the QoS thereof needs to be modified |
| flowDescription | FlowDescription | 1-2 | IP filter type; specifically, reference can be made to the definition of a Flow-Description parameter in the Rx interface specification defined by the 3GPP (Policy and Charging Control over Rx reference point, Rel7, Specification 29214) |
| qoSInformation | QoSInformation | 1 | QoS information; reference can be made to Table 6 |
| mediaType | string | 0-1 | Media type, which includes, but is not limited to, the following types:<br>AUDIO (0): audio;<br>VIDEO (1): video;<br>DATA (2): data;<br>APPLICATION (3): application;<br>and CONTROL (4): control |

TABLE 5-continued

| Parameter | Type | Number | Definition |
|---|---|---|---|
| codecData | string | 0-1 | Specifically, reference can be made to the definition of the codec-Data parameter in the Rx interface specification defined by the 3GPP (Rel7, Specification 29214) |
| reservationPriority | int | 0-1 | Priority definition; specifically, reference can be made to the definition of the Reservation-Priority parameter in the Rx interface specification defined by the 3GPP (Rel7, Specification 29214) |

It can be seen from Table 5 that, the QoS parameter carries flowNumber, flowDescription (IP filter type), and qoSInformation. The flowNumber refers to a sequence number of an IP flow, which is adapted to indicate an IP flow of an MBS that the QoS thereof needs to be modified, and a parameter type of the flowNumber is an int type. The flowDescription is adapted to describe specific features of an IP flow (including a direction of the IP flow: uplink or downlink, a source address, a destination address, a source port number, a destination port number, and a protocol type). If only a unidirectional IP flow exists, only one flowDescription exists. If both uplink and downlink IP flows exist, two flowDescription exist, and specifically reference can be made to the definition of the Flow-Description parameter in the Rx interface specification defined by the 3GPP (*Policy and Charging Control over Rx reference point*, Rel7, Specification 29214). The qoSInformation is adapted to indicate QoS after modification.

Optionally, the QoS parameter may also carry at least one of the following parameters: mediaType, codecData, and reservationPriority. The mediaType is adapted to indicate a media type corresponding to IP flow data that the QoS thereof needs to be modified, and its parameter type is a string type. The codecData is adapted to indicate media codec information in the IP flow and its parameter type is a string type, and specifically reference can be made to the definition of the codec-Data parameter in the Rx interface specification defined by the 3GPP (Rel7, Specification 29214). The reservationPriority is adapted to indicate a priority level of the IP flow relative to other IP flows and its parameter type is an int type, and specifically reference can be made to the definition of the Reservation-Priority parameter in the Rx interface specification defined by the 3GPP (Rel7, Specification 29214).

Definition of the qoSInformation is shown in Table 6.

TABLE 6

| Parameter | Type | Number | Definition |
|---|---|---|---|
| qoSClass | int | 1 | QoS index |
| maxBandwidthUL | int | 0-1 | Maximum uplink bandwidth; specifically, reference can be made to the 3GPP specification Policy and Charging Control signaling flows and QoS parameter mapping (R7, 29213) |
| maxBandwidthDL | int | | Maximum downlink bandwidth; specifically, reference can be made to the 3GPP specification Policy and Charging Control signaling flows and QoS parameter mapping (R7, 29213) |
| guaranteedBitrateUL | int | | Guaranteed uplink bit rate; specifically, reference can be made to the 3GPP specification Policy and Charging Control signaling flows and QoS parameter mapping (R7, 29213) |
| guaranteedBitrateDL | int | | Guaranteed downlink bit rate; specifically, reference can be made to the 3GPP specification Policy and Charging Control signaling flows and QoS parameter mapping (R7, 29213) |

It can be seen from Table 6 that, the qoSInformation carries qoSClass, and a parameter type of the qoSClass is an int type. The qoSClass is adapted to indicate a typal QoS value classified and numbered in advance.

Optionally, the QoS information may also carry the following information: maxBandwidthUL, maxBandwidthDL, guaranteedBitrateUL, and guaranteedBitrateDL. If the parameters (no default) are carried, the qoSClass is neglected. A parameter type of the maxBandwidthUL, maxBandwidthDL, guaranteedBitrateUL, and guaranteedBitrateDL is an int type, and specifically reference can be made to the 3GPP specification *Policy and Charging Control signaling flows and QoS parameter mapping* (R7, 29213).

Values of the qoSClass and the indicated corresponding maxBandwidthUL, maxBandwidthDL, guaranteedBitrateUL, and guaranteedBitrateDL may be saved in the USI system or the MCBCS server/controller in advance by the service/content provision server, and specifically reference can be made to Table 7.

TABLE 7

| Class | guaranteedBitrateUL | guaranteedBitrateDL | maxBandwidthUL | maxBandwidthDL |
|---|---|---|---|---|
| Class 0 | N/A | N/A | N/A | N/A |
| Class 1 | 50 Kb/s | 400 Kb/s | 200 Kb/s | 1 Mb/s |
| Class 2 | 75 Kb/S | 600 Kb/s | 300 Kb/s | 1.5 Mb/s |

It should be noted that, Table 7 is merely an example for illustrating the qoSClass and the corresponding qoSInformation, rather than limiting that the qoSClass can only set the values of the maxBandwidthUL, maxBandwidthDL, guaranteedBitrateUL, and guaranteedBitrateDL correspondingly.

UpdateMBSServiceGuide Message

When the service/content provision server needs to update an MBS service guide on the MCBCS server/controller through the USI, an UpdateMBSServiceGuide message is sent to update of the service guide in the MCBCS server/controller.

Specific definition of the UpdateMBSServiceGuide message is shown in Table 8.

TABLE 8

| Parameter | Type | Number | Definition |
|---|---|---|---|
| SessionID | string | 1 | Session identifier |
| ServiceGuide | string | 1 | Service guide content or acquisition address |
| Delivertype | int | 0-1 | Service-guide delivery type |

It can be seen from Table 8 that, the UpdateMBSServiceGuide message carries SessionID and ServiceGuide. A parameter type of the SessionID and the ServiceGuide is a string type. The SessionID is adapted to indicate an MBS session that a service guide thereof needs to be updated. One SessionID is corresponding to one MBS session. The ServiceGuide may be service guide content or a service-guide acquisition address. For the service-guide acquisition address, specific service guide content needs to be obtained according to the indicated address. The acquisition of the service guide content according to the address can be implemented by using the prior art, and the details thereof may not be given herein again.

Optionally, the UpdateMBSServiceGuide message may also carry Delivertype, which is adapted to indicate a type of delivering the service guide to a user. A parameter type of the Delivertype is an int type. If the Delivertype is not carried in the UpdateMBSServiceGuide, it indicates that the Delivertype is a default delivery type defined by the MCBCS server/controller, for example, the default type may be arranged that the service guide content is incorporated in the program content to be sent together.

UpdateMBSContent Message

If an MBS content server is deployed in a network (the physical deployment of the MBS content server is at the same entity as the MCBCS server/controller), the service/content provision server needs to firstly send MBS program content to the content server, and then the MCBCS server/controller sends the MBS program content to the user. In this scenario, if the service/content provision server needs to manage the MBS program content delivered to the content server, for example, the service/content provision server needs to insert certain content or replace a program with another, an UpdateMBSContent message is sent to the USI. The UpdateMBSContent message is adapted to trigger the MCBCS server/controller to update the program content on the content server.

Specific definition of the UpdateMBSContent message is shown in Table 9.

TABLE 9

| Parameter | Type | Number | Definition |
|---|---|---|---|
| SessionID | string | 1 | Session identifier |
| Content | string | 1 | Content or acquisition address |
| Type | int | 1 | Content update type |

It can be seen from Table 9 that, the UpdateMBSContent message carries SessionID, Content, and Type. A parameter type of the SessionID and Cotent is a string type. A parameter type of the Type is an int type. The SessionID is adapted to indicate an MBS session that the content thereof needs to be updated. One SessionID is corresponding to one MBS session. The Content may be MBS program content or an MBS program content acquisition address. For the MBS program content acquisition address, the specific program content needs to be obtained according to the indicated address. The acquisition of the program content according to the address can be implemented by using the prior art, and the details thereof may not be given herein again. The Type is adapted to indicate a type that the MCBCS server/controller updates the MBS program content on the content server.

It should be noted that optionally, the StartMBSSession message or the TerminateMBSSession message or the SubscribeMBSEvent message or the StopMBSEvent message or the ModifyMBSSessionQoS message or the UpdateMBSServiceGuide message or the UpdateMBSContent message may further carry a Charging-identifier, which is adapted to indicate accounting of the MBS management operation service. Definition of the Charging-identifier is shown in Table 10. A parameter type of the Charging-identifier is a string or an int type. A specific accounting method and accounting policy in the prior art can be adopted, and the details thereof may not be given herein again.

TABLE 10

| Parameter | Type | Number | Definition |
|---|---|---|---|
| Charging-identifier | int/string | 1 | Charging-identifier |

It should be noted that in the message definitions in the embodiments of the present invention, the StartMBSSession message or the TerminateMBSSession message or the SubscribeMBSEvent message or the StopMBSEvent message or the ModifyMBSSessionQoS message or the UpdateMBSServiceGuide message or the UpdateMBSContent message does not particularly carry a message requestor-ID parameter. As in the prior art, the requestor-ID (that is, the service/content provision server ID) serves as a part of a standard message header in an invoking scheme of a U1 interface (an interface between the USI system and the service/content provision server, as shown in FIG. 2), and the MCBCS server/controller may obtain the requestor-ID when processing the message header. Optionally, as a replacement for the prior art, in the message definitions in the embodiments, the requestor- ID may also be added in the StartMBSSession message, the TerminateMBSSession message, the SubscribeMBSEvent message, the StopMBSEvent message, the ModifyMBSSessionQoS message, the UpdateMBSServiceGuide message, and the UpdateMBSContent message, so as to enable the MCBCS server/controller to identify a requestor of a message. Definition of the requestor-ID is shown in Table 11, and a parameter type of the requestor-ID is a string type.

TABLE 11

| Parameter | Type | Number | Definition |
|---|---|---|---|
| Requestor-ID | string | 1 | Requestor identifier |

It should be noted that, according to the definition requirements of a USI system in the prior art, the MBS-session management operation request message needs to be registered with the USI in advance, so that the USI provides a third party interface for the MBS-session management operation service. The registration process varies as different implementation modes are employed for the messages defined in the embodiments of the present invention. However, no matter which implementation mode is adopted, as long as the MBS-session management operation request message is clearly defined, the implementation mode of registering the MBS-session management operation request message with the USI is already defined in the prior art, which can be realized by persons skilled in the art without any creative work, so the details thereof may not be given herein again.

In Step 302, the USI system performs authentication on the MBS-session management operation request message. When the authentication is successful, the MBS-session management operation request message is forwarded to the MCBCS server/controller.

The authentication of the MBS-session management operation request message by the USI system is specifically to determine whether the service/content provision server has the authority to invoke the USI interface. A parameter serving as a reference in the authentication is mainly an ID of the service/content provision server. The ID of the service/content provision server is included in a header of the MBS-session management operation request message. As shown in FIG. 2, the service/content provision server defined in the embodiment of the present invention sends the MBS-session management operation request message to the USI through the U1 interface. The USI system defines that the U1 interface serves as an interface between the USI and a third party service provider. It is a universal definition in the prior art that the ID of the third party service provider is included in a header of an invoking message of the U1 interface. Therefore, it is also in the prior art that the header of the MBS-session management operation request message shall include the ID of the service/content provision server. The authentication process is also described in the prior art, and the details thereof may not be given herein again.

It should be further noted that, as it is in the prior art that the header of the MBS-session management operation request message includes the ID of the service/content provision server, when the specific definition of the MBS-session management operation request message is illustrated in the foregoing, the universal parameters including the ID of the service/content provision server that are required in a message of invoking the U1 interface as defined in the prior art are not illustrated. The universal parameters that are required in the message of invoking the U1 interface as defined in the prior art shall also be included in each specific MBS-session management operation request message according to the specification in the prior art.

In Step 303, the MCBCS server/controller performs corresponding management operations on the MBS session according to the MBS-session management operation request message.

Specific content of the corresponding management operations for all specific MBS-session management operation request messages are respectively illustrated in the following.

If the MBS-session management operation request message is a StartMBSSession message, the management operation is that the MCBCS server/controller finds a corresponding MBS session according to the SessionID. If the corresponding MBS session is already in an active state (data is delivered), a success response is returned. If the corresponding MBS session is in an inactive play state (no data is delivered), the state of the session is changed into the active state, the data of which delivery is terminated is delivered again, and a success response is returned subsequently.

If the MBS-session management operation request message is a TerminateMBSSession message, the management operation is that the MCBCS server/controller finds a corresponding MBS session according to the SessionID. If the corresponding MBS session is already in a terminated state (no data is delivered), a success response is returned. If the corresponding MBS session is in a non-terminated state (data is delivered), the state of the session is changed into the terminated state, the data being delivered is no longer delivered, and a success response is returned subsequently.

If the MBS-session management operation request message is a SubscribeMBSEvent message, the management operation is that an event management functional entity in the MCBCS server/controller generates an event subscription session for the current event subscription. The event subscription session records the following information: an initiator of a SubscribeEvent message, a subscription event, subscription duration (Duration), an interval of sending reports, and the MBS session for the event subscription. The event management functional entity finds the corresponding MBS session according to the SessionID, determines an event that needs to be notified in the session according to the EventPackage, and marks the event as the event that needs to be notified, for example, sets a notification flag of the event to true. Once these events occur and it is detected that notification is needed (for example, the notification flag is true), the event management functional entity notifies the event content. After the event that needs to be notified is set, if the SubscribeMBSEvent message carries the subscription duration (Duration), the MCBCS server/controller starts a timer and a time length thereof is a value of the Duration. After the timer expires, the event subscription is deleted. If the SubscribeMBSEvent message carries a periodic notification interval (Interval), the event is notified periodically according to the Interval. It should be noted that, a statistics event is usually subscribed in the SubscribeMBSEvent message carrying the Interval, for example, statistics are made on the number of users every ten minutes. At this time, data is not notified every time a change occurs but the statistics data of the number of users is notified every ten minutes.

The notification event is specifically to send an event notification message. The event notification message may be forwarded through the USI or sent to the service/content provision server directly. Specific definition of the event notification message is shown in Table 12.

TABLE 12

| Parameter | Type | Number | Definition |
| --- | --- | --- | --- |
| Event package | Event | 1+ | Notification event package |

It can be seen from Table 12 that, the event notification message carries at least one event package. The event package is corresponding to the name of the event package carried in the SubscribeMBSEvent message in Step 301. A parameter type of the event package is an event type. Specific definition of the event type is shown in Table 13.

TABLE 13

| Parameter | Type | Number | Definition |
| --- | --- | --- | --- |
| Event type | int | 1 | Type of a notification event |
| Event content | string | 1+ | Event content |

It can be seen from Table 13 that, the event package includes an event type parameter and at least one event content parameter. A parameter type of the event type parameter is an int type, which is adapted to indicate a type of a notification event, for example, the number of users. A parameter type of the event content parameter is a string type, which is adapted to indicate content of the notification event, for example, specific data of the number of users.

If the MBS-session management operation request message is a StopMBSEvent message, the management operation is that the event management functional entity in the MCBCS server/controller finds a corresponding MBS session according to the SessionID, determines which subscribed event of the session shall be cancelled according to a name of a StopEventPackage, and changes a notification flag of the event into "no notification" (for example, the flag is set to false). Optionally, if all the subscribed events are cancelled, the corresponding event subscription session generated by the event management functional entity when the event subscription is performed previously may also be deleted.

If the MBS-session management operation request message is a ModifyMBSSessionQoS message, the management operation is that the event management functional entity in the MCBCS server/controller finds a corresponding MBS session according to the SessionID, and the MCBCS server/controller sends a QoS request to a WiMAX dynamic QoS subsystem. The WiMAX dynamic QoS subsystem is defined in a WiMAX network in the prior art. For example, the WiMAX dynamic QoS subsystem may be a policy and charging control (PCC) system, and the MCBCS server/controller is enabled to send a QoS request message to the PCC system through an Rx interface, so as to request the PCC system to update QoS of the MBS session dynamically. The QoS request message carries the QoS parameter (qoSFlowInfo) carried in the ModifyMBSSessionQoS message. The QoS dynamic update is described in the prior art, and the details thereof may not be given herein again.

If the MBS-session management operation request message is an UpdateMBSServiceGuide message, the management operation is that the event management functional entity in the MCBCS server/controller finds a corresponding MBS session according to the SessionID. The MCBCS server/controller obtains service guide content according to the ServiceGuide parameter. The process of obtaining the service guide content is described as follows. If the ServiceGuide parameter itself is the service guide content, the service guide content is directly obtained. If the ServiceGuide parameter is a service guide content acquisition address, the service guide content is obtained according to the acquisition address. The MCBCS server/controller sends the service guide content to a user according to a delivery type indicated by the Deliver-type. The delivery type may be a type that the service guide content is sent with the program content (the service guide content is incorporated in the program content), or other delivery types such as a short message or a multimedia message.

If the MBS-session management operation request message is an UpdateMBSContent message, the management operation is that the event management functional entity in the MCBCS server/controller finds a corresponding MBS session according to the SessionID, and the MCBCS server/controller obtains the program content according to the program content parameter. The process of obtaining the program content is described as follows. If the program content parameter itself is the program content, the program content is directly obtained. If the program content parameter is a program content acquisition address, the program content is obtained according to the acquisition address. The MCBCS server/controller updates the MBS program content on the content server according to an update type indicated by the content update type parameter (Type), such as replacement or insertion.

In Step 304, the MCBCS server/controller sends an operation result response message to the USI. The USI forwards an operation result response message to the service/content provision server. The management operation response message is adapted to feed back a corresponding management operation result to the service/content provision server.

The management operation response message may be specifically an acknowledgement (ACK) message. Specific definition of the ACK message is shown in Table 14.

TABLE 14

| Field | Type | Number | Description |
| --- | --- | --- | --- |
| ResultCode | string | 1 | Result indication; specifically, reference can be made to the definitions of Diameter Base Protocol RFC 3588 by The Internet Engineering Task Force (IETF) as follows:<br>1xxx (Informational);<br>2xxx (Success);<br>3xxx (Protocol Errors);<br>4xxx (Transient Failures); and<br>5xxx (Permanent Failure).<br>For example, 2001 represents that the request has been successfully processed. |
| ErrorMessage | string | 0-1 | Error message |

It can be seen from Table 14 that, the ACK message carries the ResultCode. Optionally, the ACK message may further carry an ErrorMessage. A parameter type of the ResultCode and the ErrorMessage is a string type. The definition of the ACK message is described in the prior art, and the details thereof may not be given herein again.

Through the application of the method according to the embodiment of the present invention, the service/content provision server sends an MBS-session management operation request message to the USI. The USI forwards the MBS-session management operation request message to the MCBCS server/controller after authentication. The MCBCS server/controller performs corresponding management operations according to the MBS-session management operation request message, and feeds back a management operation result in a management operation response message through the USI to the service/content provision server, so that the service/content provision server is enabled to manage the MBS operated by the service/content provision server itself.

In an embodiment, the present invention provides an MBS management device.

Figure 4:
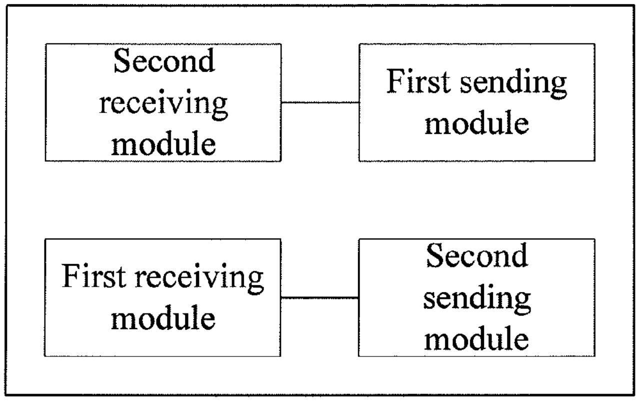
FIG. 4 is a schematic structural view of an MBS management device according to an embodiment of the present invention.

As shown in FIG. 4, the device includes a first receiving module and a first sending module.

The first receiving module is adapted to receive a management operation request message from a service/content provision server.

The first sending module is adapted to send the management operation request message received by the first receiving module to an MCBCS server/controller, so that the MCBCS server/controller performs corresponding operations according to the management operation request message.

Optionally, the device may further include a second receiving module and a second sending module.

The second receiving module is adapted to receive the management operation response message from the MCBCS server/controller.

The second sending module is adapted to send the management operation response message received by the second receiving module to the service/content provision server.

The device may be a USI.

Through the application of the device according to the embodiment of the present invention, a management operation request message from the service/content provision server is forwarded to the MCBCS server/controller, so that the MCBCS server/controller performs corresponding operations according to the management operation request, and a management operation response message from the MCBCS server/controller is forwarded to the service/content provision server, thereby enabling the service/content provision server to manage the MBS operated by the service/content provision server itself. In an embodiment, the present invention provides an MBS management device.

Figure 5:
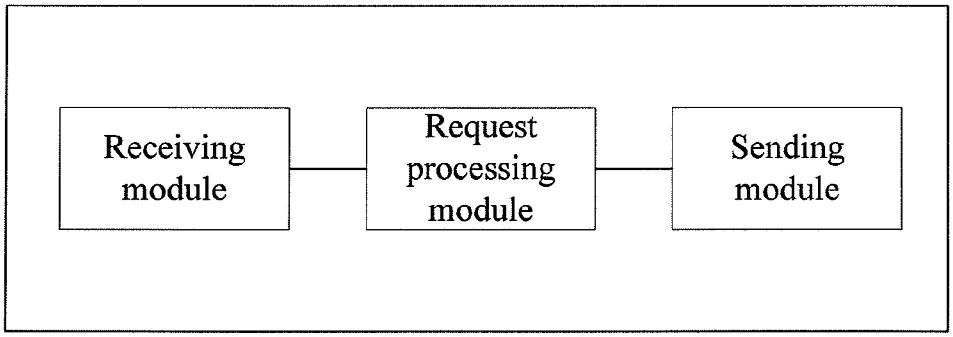
FIG. 5 is a schematic structural view of an MBS management device according to an embodiment of the present invention.

As shown in FIG. 5, the device includes a receiving module and a request processing module.

The receiving module is adapted to receive an MBS-session management operation request message from a USI. The MBS-session management operation request message is forwarded from a service/content provision server.

The request processing module is adapted to perform corresponding management operations according to the MBS-session management operation request message received by the receiving module.

Optionally, the device may further include a sending module.

The sending module is adapted to send a management operation response message to the USI according to a management operation result from the request processing module, so that the USI forwards the management operation response message to the service/content provision server.

The device may be an MCBCS server/controller.

Through the application of the device according to the embodiment of the present invention, an MBS-session management operation request message forwarded by the USI from the service/content provision server is received, corresponding management operations are performed according to the MBS-session management operation request message, and a management operation result is fed back to the service/content provision server in a management operation response message through the USI, so that the service/content provision server is enabled to manage the MBS operated by the service/content provision server itself.

In an embodiment, the present invention provides an MBS management system.

Figure 6:
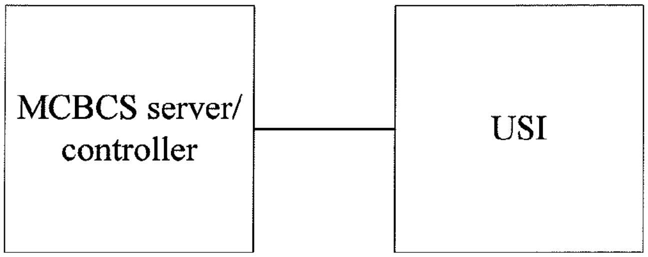
FIG. 6 is a schematic formation view of an MBS management system according to an embodiment of the present invention.

As shown in FIG. 6, the system includes an MCBCS server/controller and a USI connected to the MCBCS server/controller in a communication mode.

The USI is adapted to forward an MBS-session management operation request message from a service/content provision server to the MCBCS server/controller.

The MCBCS server/controller is adapted to receive the MBS-session management operation request message from the USI and perform corresponding management operations according to the MBS-session management operation request message.

Optionally, the MCBCS server/controller is further adapted to send a management operation response message to the USI according to a management operation result.

The USI is further adapted to forward the management operation response message to the service/content provision server.

Through the application of the system according to the embodiment of the present invention, the service/content provision server sends an MBS-session management operation request message to the USI, the USI forwards the MBS-session management operation request message to the MCBCS server/controller, and the MCBCS server/controller performs corresponding management operations according to the MBS-session management operation request message and feeds back a management operation result to the service/content provision server in a management operation response message through the USI, so that the service/content provision server is enabled to manage the MBS operated by the service/content provision server itself.

Through the application of the method, device, and system according to the embodiments of the present invention, the service/content provision server sends an MBS-session management operation request message to the USI, the USI forwards the MBS-session management operation request message to the MCBCS server/controller after authentication, and the MCBCS server/controller performs corresponding management operations according to the MBS-session management operation request message and feeds back a management operation result to the service/content provision server in a management operation response message through the USI, so that the service/content provision server is enabled to manage the MBS operated by the service/content provision server itself.

Through the above description of the implementation, it is clear to persons skilled in the art that the present invention may be accomplished through hardware, or through software plus a necessary universal hardware platform. But in many cases, the software implementation is preferred. Based on this, the above technical solutions or the part that makes contributions to the prior art can be substantially embodied in the form of a software product. The computer software product may be stored in a computer readable storage medium such as a floppy disk, a hard disk, or an optical disk, and contain several instructions to instruct computer equipment (for example, a personal computer, a server, or network equipment) to perform the method described in the embodiments of the present invention.

Finally, it should be noted that the above embodiments are merely provided for elaborating the technical solutions of the present invention, but not intended to limit the present invention. It should be understood by persons of ordinary skill in the art that although the present invention has been described in detail with reference to the foregoing embodiments, modifications or equivalent replacements can be made to the technical solutions without departing from the spirit and scope of the present invention.

What is claimed is:

1. A multicast broadcast service (MBS) management method, comprising:

receiving, by a universal service interface (USI), a management operation request message from a service/content provision server; and sending by the USI, the management operation request message to a multicast and broadcast service (MCBCS) server/controller to enable the MCBCS server/controller to perform corresponding operations according to the management operation request message, receiving by the USI, a management operation response message from the MCBCS server/controller and forwarding the management operation response message to the service/content provision server.

2. The method according to claim 1, wherein the management operation request message is a first message or a second message, the first message or the second message carries at least one session identifier (SessionID); the first message is adapted to start a MBS session, and the second message is adapted to terminate or suspend the MBS session; and the performing, by the MCBCS server/controller, the corresponding operations according to the management operation request message comprises:

searching, by the MCBCS server/controller, for a corresponding MBS session according to the SessionID; and if the management operation request message is the first message and the corresponding MBS session is in an active state, not performing a session activation operation;

or, if the management operation request message is the first message and the corresponding MBS session is in an inactive state, changing the state of the MBS session into the active state;

or, if the management operation request message is the second message and the corresponding MBS session is in a terminated state, not performing a session termination operation;

or, if the management operation request message is the second message and the corresponding MBS session is in a non-terminated state, changing the state of the MBS session into the terminated state.

3. The method according to claim 1, wherein the management operation request message is a third message, and the third message carries a SessionID and at least one name of a subscribed event package; the third message is adapted to subscribe to a corresponding event of a MBS session; and the performing, by the MCBCS server/controller, the corresponding operations according to the management operation request message comprises:

generating, by an event management functional entity in the MCBCS server/controller, an event subscription session;

searching for a corresponding MBS session according to the SessionID;

determining an event that the MBS session needs to notify according to the name of the subscribed event package and marking the event; and if the marked event occurs, notifying the event.

4. The method according to claim 3, wherein the notifying the event comprises:

sending an event notification message to the service/content provision server, wherein the event notification message carries at least one event package, and the event package comprises an event type parameter and at least one event content parameter.

5. The method according to claim 1, wherein the management operation request message is a third message, and the third message carries a SessionID, at least one name of a subscribed event package, and subscription duration or a periodic notification interval; the third message is adapted to subscribe to a corresponding event of a MBS session; and the performing, by the MCBCS server/controller, the corresponding operations according to the management operation request message comprises:

generating, by an event management functional entity in the MCBCS server/controller, an event subscription session for the current event subscription;

searching for a corresponding MBS session according to the SessionID;

determining an event that the MBS session needs to notify according to the name of the subscribed event package and marking the event; and if the request message carries the subscription duration, during the subscription duration, if the marked event occurs, notifying the event and deleting the event subscription session after the subscription duration is expired;

or, if the request message carries the periodic notification interval, notifying the event according to the periodic notification interval.

6. The method according to claim 5, wherein the notifying the event comprises:

sending an event notification message to the service/content provision server, wherein the event notification message carries at least one event package, and the event package comprises an event type parameter and at least one event content parameter.

7. The method according to claim 1, wherein the management operation request message is a forth message; the forth message is adapted to cancel subscription of a corresponding event of a MBS session; and if the forth message carries a SessionID and at least one name of a subscribed event package which need be cancelled;

the performing, by the MCBCS server/controller, the corresponding operations according to the management operation request message comprises:

searching, by an event management functional entity in the MCBCS server/controller, for a corresponding MBS session according to the SessionID;

determining which subscribed event of the corresponding MBS session shall be cancelled according to the name of the subscribed event package which need be cancelled and changing a notification flag of the subscribed event into "no notification";

or, if the name of the subscribed event package which need be cancelled comprises names of all the subscribed event packages in the corresponding MBS session;

the performing, by the MCBCS server/controller, the corresponding operations according to the management operation request message comprises:

deleting a corresponding event subscription session generated by the event management functional entity during the previous corresponding event subscription.

8. The method according to claim 1, wherein the management operation request message is a fifth message, and the fifth message carries a SessionID and at least one QoS parameter; the fifth message is adapted to initiate QoS update of a corresponding session;

the performing, by the MCBCS server/controller, the corresponding operations according to the management operation request message comprises:

searching, by an event management functional entity in the MCBCS server/controller, for a corresponding MBS session according to the SessionID;

sending, by the MCBCS server/controller, a QoS request message to a dynamic QoS subsystem in a Worldwide Interoperability for Microwave Access (WiMAX) network; and wherein the QoS request message carries the QoS parameter carried in the fifth message.

9. The method according to claim 1, wherein the management operation request message is an sixth message; the sixth message is adapted to update a service guide; the sixth message carries a SessionID and a ServiceGuide parameter, and the ServiceGuide parameter is service guide content or a service guide acquisition address; and the performing, by the MCBCS server/controller, the corresponding operations according to the management operation request message comprises:

searching, by an event management functional entity in the MCBCS server/controller, for a corresponding MBS session according to the SessionID;

if the ServiceGuide parameter is the service guide content, obtaining, by the MCBCS server/controller, the service guide content directly; or if the ServiceGuide parameter is the service guide content acquisition address, obtaining, by the MCBCS server/controller, the service guide content according to the service guide content acquisition address.

10. The method according to claim 9, wherein the sixth message further carries a service-guide delivery type parameter, and the performing, by the MCBCS server/controller, the corresponding operations according to the management operation request message further comprises:

sending, by the MCBCS server/controller, the service guide content to a user according to a delivery type indicated by the service-guide delivery type parameter.

11. The method according to claim 1, wherein the management operation request message is an seventh message, the seventh message carries a SessionID, a content parameter, and a content update type, and the content parameter is MBS program content or an MBS program content acquisition address; the seventh message is adapted to update the program content on a content server; and the performing, by the MCBCS server/controller, the corresponding operations according to the management operation request message comprises:

searching, by an event management functional entity in the MCBCS server/controller, for a corresponding MBS session according to the SessionID;

if the program content parameter is the MBS program content, obtaining, by the MCBCS server/controller, the MBS program content directly; or if the program content parameter is the MBS program content acquisition address, obtaining, by the MCBCS server/controller, the MBS program content according to the MBS program content acquisition address; and updating, by the MCBCS server/controller, the MBS program content on a content server according to an update type indicated by the content update type.

12. A multicast broadcast service (MBS) management device, comprising:

a first receiving module, adapted to receive a management operation request message from a service/content provision server; and a first sending module, adapted to forward the management operation request message received by the first receiving module to a multicast and broadcast service (MCBCS) server/controller to enable the MCBCS server/controller to perform corresponding operations according to the management operation request message, a second receiving module, adapted to receive a management operation response message from the MCBCS server/controller; and a second sending module, adapted to forward the management operation response message received by the second receiving module to the service/content provision server.

13. A multicast broadcast service (MBS) management device, comprising:

a receiving module, adapted to receive an MBS-session management operation request message from a universal service interface (USI), wherein the MBS-session management operation request message is forwarded from a service/content provision server;

a request processing module, adapted to perform corresponding management operations according to the MBS-session management operation request message received by the receiving module; and a sending module, adapted to send a management operation response message to the USI according to a management operation result from the request processing module to enable the USI to forward the management operation response message to the service/content provision server.

14. A multicast broadcast service (MBS) management system, comprising:

a multicast and broadcast service (MCBCS) server/controller and a universal service interface (USI) in communication with the MCBCS server/controller, wherein the USI is adapted to forward an MBS-session management operation request message from a service/content provision server to the MCBCS server/controller, and the MCBCS server/controller is adapted to receive the MBS-session management operation request message from the USI, and perform corresponding management operations according to the MBS-session management operation request message, the MCBCS server/controller is further adapted to send a management operation response message to the USI according to a management operation result, and the USI is further adapted to forward the management operation response message to the service/content provision server.

* * * * *